United States Patent
Hallman et al.

(10) Patent No.: US 6,658,849 B1
(45) Date of Patent: Dec. 9, 2003

(54) MANUAL BOOST CONTROL VALVE FOR A TURBOCHARGER

(76) Inventors: Marc B. Hallman, 3686 Highspire St. NE., North Canton, OH (US) 44721; Duane L. Hallman, 5395 Parks Ave. NE., Louisville, OH (US) 44641

( * ) Notice: Subject to any disclaimer, the term of this patent is extended or adjusted under 35 U.S.C. 154(b) by 0 days.

(21) Appl. No.: 10/278,157

(22) Filed: Oct. 23, 2002

(51) Int. Cl.$^7$ .............................................. F02D 23/00
(52) U.S. Cl. ........................................ 60/602; 60/397
(58) Field of Search ................................. 60/602, 397

(56) References Cited

U.S. PATENT DOCUMENTS

| | | | | |
|---|---|---|---|---|
| 2,028,586 A | * | 1/1936 | Bragg et al. ................... | 60/397 |
| 3,931,712 A | * | 1/1976 | Keller ........................... | 60/602 |
| 4,197,711 A | * | 4/1980 | Fuhrmann et al. ............. | 60/602 |
| 4,466,248 A | * | 8/1984 | Nartowski .................... | 60/602 |
| 5,199,260 A | * | 4/1993 | Iwick ........................... | 60/602 |
| 5,214,919 A | * | 6/1993 | Jiewertz et al. ................ | 60/602 |
| 6,401,458 B2 | * | 6/2002 | Jacobson ..................... | 60/602 |

FOREIGN PATENT DOCUMENTS

EP 1150032 A2 * 10/2001 ........... F16D/48/06

OTHER PUBLICATIONS

HBC (Hallman Boost Controller) Installation Instructions (admitted prior art).
TurboSmart FG–GBCV–IC Boost Controller Installation Instructions, publication date unknown; from www.turbosmart.com.au.

* cited by examiner

Primary Examiner—Thomas Denion
Assistant Examiner—Thai-Ba Trieu
(74) Attorney, Agent, or Firm—Renner, Kenner, Greive, Bobak, Taylor & Weber

(57) ABSTRACT

This invention provides a manual boost control valve for an automotive turbocharger. The valve communicates between the intake side and exhaust side of the turbocharger system and particularly communicates with a wastegate actuator that operates a wastegate at the exhaust side. The wastegate actuator operates the wastegate in accordance with the degree of airflow received through the valve, and the valve may be manually manipulated from within the interior of the automobile by a knob interconnected through a cable to a restriction coupling.

5 Claims, 2 Drawing Sheets

MANUAL BOOST CONTROL VALVE FOR A TURBOCHARGER

BACKGROUND OF THE INVENTION

The present invention relates to automotive turbochargers. More particularly, this invention relates to a boost control valve for automotive turbochargers that communicates with the interior of the automobile to allow for manual adjustment from within the automobile.

Turbochargers are well known accessories for race cars and other high-performance vehicles. These forced induction systems compress the air flowing into each cylinder of the automobile's engine, so that more fuel may also be added, leading to the realization of more power from each cylinder. Turbochargers use the force of the exhaust air flow from an engine to drive a turbine that, in term, operates an air pump or compressor that pressurizes the air going into the cylinders.

It is well known that turbochargers do not provide an immediate power boost, but rather the turbine in the exhaust must reach a threshold speed before a boost is produced. Generally, there is a lag between the time when the gas is applied and the boost is realized. This turbo lag is lessened by reducing the inertia of the rotating turbine and compressor, thereby allowing them to accelerate more quickly upon application of the fuel and, thus, provide the boost sooner. The inertia of these rotating parts may be reduced by reducing the size, more particularly the weight, of the turbocharger. However, while a smaller turbocharger of less mass will respond more quickly at lower engine speeds, it may not be able to provide a significant turbo boost at higher engine speeds, and may also be in danger of rotating too quickly at high engine speeds.

Wastegates allow for the employment of smaller, lighter, turbines, while preventing these light turbines from spinning too quickly at high engine speeds. The wastegate works by sensing the boost pressure and, when the pressure gets too high, thereby indicating that the turbine might be spinning too quickly, some of the exhaust air flow may bypass around the turbine blades, thus slowing them down.

Various types of control valves for turbochargers are generally known. However, it is appreciated that there is a need in the art for a boost control valve that can be manually manipulated from within the interior or "cockpit" of the automobile. Some electronic boost controllers may be set and controlled from within the automobile, but, to date, no manual boost control valves have been provided. The present invention provides a manual boost control valve, for turbochargers employing wastegates, as generally described above, that can be manually set and controlled from within the automobile.

SUMMARY OF THE INVENTION

In general, the present invention provides a manual boost control valve for an automobile turbocharger of the type having a turbine that is spun by the air flow in the exhaust of the automobile, a compressor connected to the turbine to rotate therewith and thereby pressurize the air flow into the cylinders of the automobile, and a wastegate located in the exhaust of the automobile for bypassing a portion of the air flow in the exhaust around the turbine. This manual boost control valve includes an intake line having an inlet and an outlet, the inlet communicating with the air flow pressurized by the compressor. A restriction coupling having an inlet and an outlet communicates, at its inlet, with the outlet of the intake line, and, thus, receives air flow pressurized through the intake line. The inlet of an actuator line communicates with the outlet of the restriction coupling so as to receive air flow pressurized through the restriction coupling. An outlet of the restriction coupling communicates with the wastegate actuator of the turbocharger. The restriction coupling further includes a biased stopper blocking the connection between the outlet of the intake line and the inlet of the restriction coupling, such that the air flow pressurized through the intake line must be sufficient to move the biased stopper in order that any air would be able to flow through the restriction coupling and into the actuator line. Means for adjusting the degree of bias placed on the bias stopper is provided such that the degree of bias can be manipulated from within the cockpit of the automobile. By adjusting the degree of bias placed on the biased stopper, the conditions under which pressurized air will reach the wastegate actuator will be controlled so as to thereby control the turbocharger performance.

In operation, the wastegate actuator of the turbocharger receives air flow pressurized through the actuator line of the boost control valve, and the wastegate actuator communicates with the wastegate of the turbocharger for manipulating the wastegate in accordance with the pressure of the air flow received through the actuator line. The degree to which the wastegate is manipulated, and, thus, the degree to which the turbo boost is controlled, is dependent upon the pressure of the air flowing first through the intake line, then through the restriction coupling, and, thereafter, through the actuator line and into the wastegate actuator.

PREFERRED EMBODIMENT FOR CARRYING OUT THE INVENTION

Figure 1:
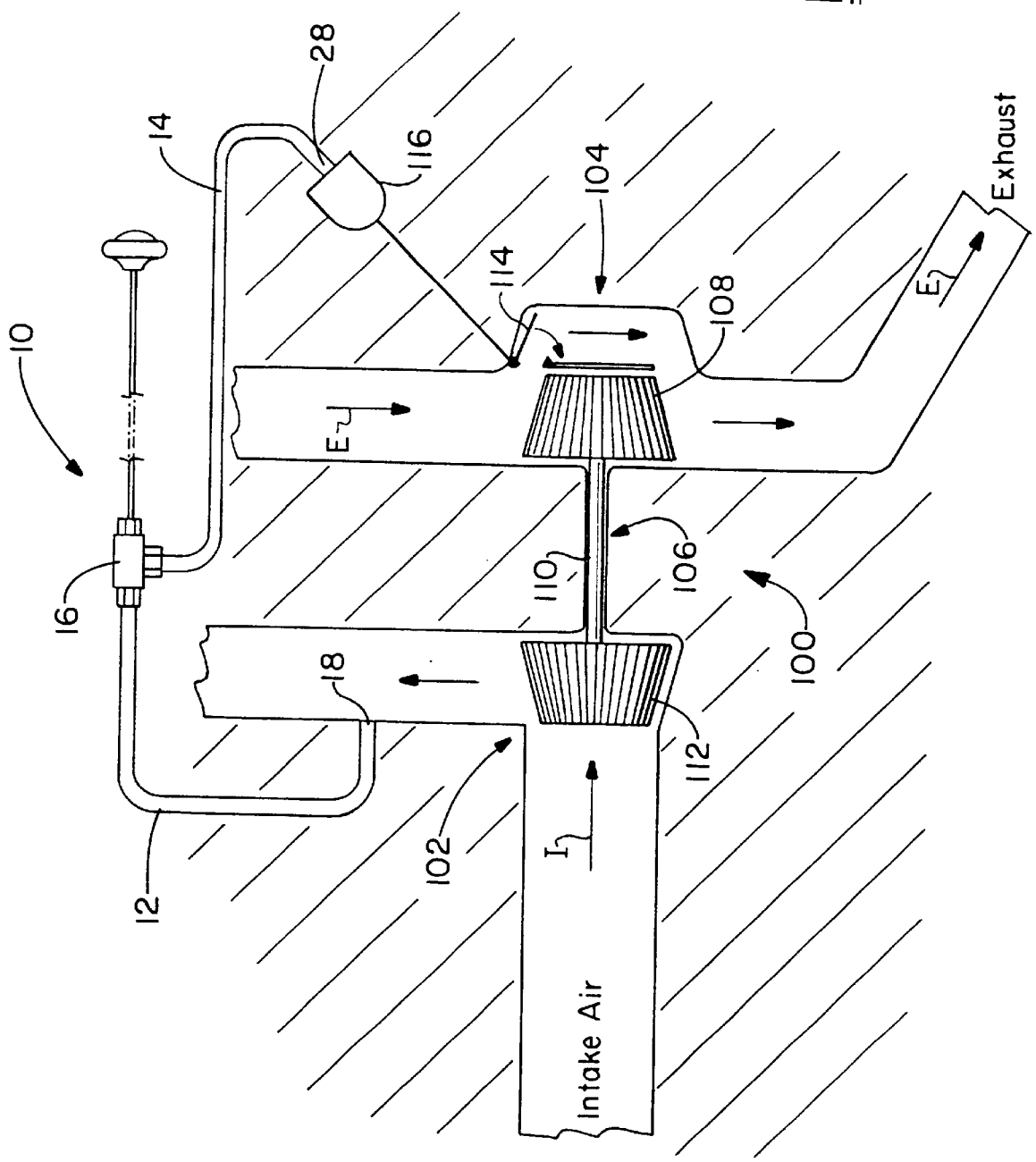
FIG. 1 is a schematic representation of a turbocharger and its employment in an intake and exhaust system, and further represents how a manual boost control valve of this invention is employed therewith.

The manual boost control valve of this invention is employed with automobile turbochargers. FIG. 1 schematically represents a turbocharger as it is employed in an automobile's air intake and exhaust system, and further represents how a manual boost control valve 10 is employed in relation to this system. A combined turbocharger and intake and exhaust system 100 (turbocharger system 100) is represented in the drawings and discussed herein with reference to the numerals 100 and greater, and these elements represent the environment in which valve 10 is employed. Valve 10 is the focus of this invention, and is represented in the drawings and discussed herein with reference to double-digit numerals 10 and greater.

Turbocharger system 100 includes an intake side 102 and an exhaust side 104. As is generally known, a turbocharger 106 bridges between the intake side 102 and the exhaust side 104, and utilizes the energy of the exhaust air flow coming from the cylinders (not shown) of an automobile, represented generally by the letter E, to pressurize intake air flow I in the direction of, and into, the cylinders of the automobile. By forcing more air into the cylinders, more fuel may be employed, and more power may be realized.

More particularly, the turbocharger 106 includes a turbine 108 that is located in the path of the exhaust air flow E and is spun thereby, and this turbine 108 is connected by a shaft 110 to a compressor 112 that is located in the path of the intake air flow I. As the exhaust air flow E spins the turbine 108, the compressor 112 is driven as well. Compressor 112 is generally a centrifugal pump, drawing air in at its center and forcing it outwardly, toward the cylinders. Thus, turbocharger 106 translates the waste energy of the exhaust air flow E into useful energy for increasing the pressure of the intake air flow I into the cylinders.

A wastegate 114 is located in the exhaust side 104, and serves, in appropriate circumstances, to direct at least a portion of the exhaust air flow E to bypass the turbine 108. The wastegate 114 is typically employed to ensure that the turbine 108 does not spin too quickly at high engine speeds. Wastegate 114 also serves as a power regulator inasmuch as the degree of boost is related to the force of the exhaust air flow E that spins turbine 108. A wastegate actuator 116 senses the boost pressure, through a communication with intake side 102, namely, through manual boost control valve 10 of this invention, and, according to preset parameters, opens or closes the wastegate 114 to regulate the boost that is realized.

Figure 2:
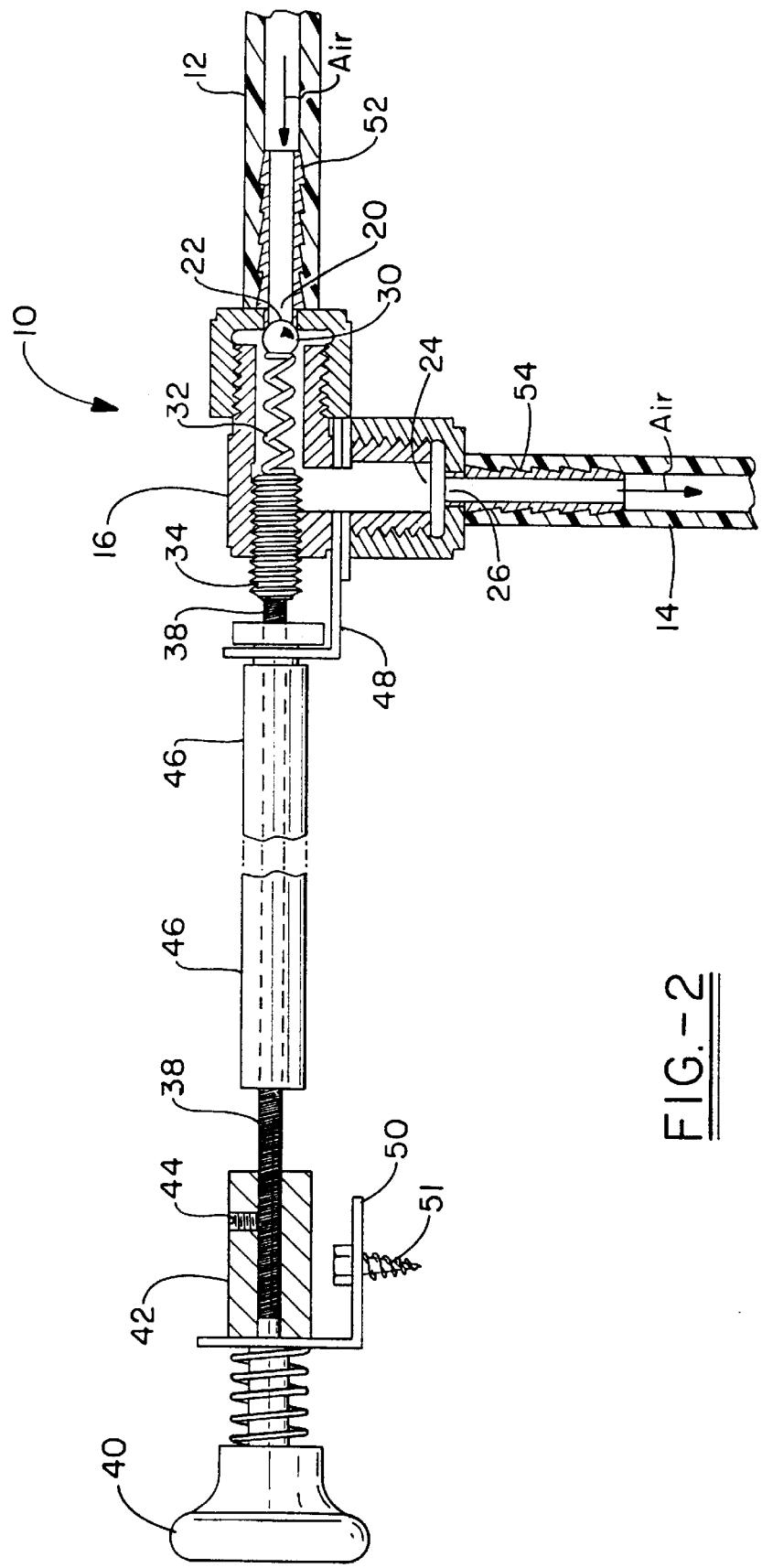
FIG. 2 is an exploded view of a manual boost control valve of this invention, with portions removed for showing the internal elements and their operation.

With reference to FIGS. 1 and 2, it can be seen that manual boost control valve 10 includes an intake line 12 and an actuator line 14 coupled by a restriction coupling 16. The intake line 12 has an inlet 18, which communicates with the intake side 102 of the turbocharger system 100, and an outlet 20 that communicates with restriction coupling 16, at an inlet 22 thereof. An outlet 24 of the restriction coupling 16 communicates with an inlet 26 of the actuator line 14, and the actuator line 14 communicates with wastegate actuator 116 at its outlet 28. Thus, the wastegate actuator 116 may sense the boost pressure through the manual boost control valve 10 because the intake air I pressurized by the compressor 112 and forced toward the cylinders through the intake side 102 may flow through intake line 12, restriction coupling 16, and actuator line 14 to reach wastegate actuator 116. However, restriction coupling 16 may be manipulated to put adjustable restriction in the air lines 12, 14 that communicate between the intake side 102 and the wastegate actuator 116.

More particularly, the restriction coupling 16 includes a biased stopper 30 that blocks the communication between the outlet of the intake line 12 and the inlet of the restriction coupling 16. The biased stopper 30 is shown herein as being a ball that stops up or seals the generally circular intake line 12, but it will be appreciated that other stopper elements may be employed in accordance with this invention. The biased stopper 30 is biased by a spring 32, which in turn may have its stress adjusted by the adjustment of a bullit 34, as can be seen in the FIGS., on the side of restriction coupling 16 that is opposite its communication with intake line 12. A cable 38 connects to the bullit 34, at one end thereof, and connects to a knob 40, at the other end thereof, through a fitting 42 and hex screw 44. By turning the knob 40, the bullit 34 will advance into or retract from the interior of restriction coupling 16 such that the degree of bias placed upon the biased stopper 30 can be adjusted. While the means for adjusting the degree of bias placed upon the biased stopper 30 is disclosed herein as being composed of a ball stopper with a associated knob 40, cable 38, bullit 34, and spring 32, it should be appreciated that other means for manually manipulating the degree of bias placed upon a stopper, whether a ball stopper or of other configuration, may take other manual forms that are sufficient for incrementally adjusting the degree of the blockage of the inlet 18 of intake line 12 into restriction coupling 16.

The present invention focuses upon providing a means for manually manipulating the power and performance of a turbocharger mounted in an automobile, and, thus, it is a particular aspect of the present invention that the manual boost control valve 10 is mounted to a turbocharger system 100 in such a manner that knob 40 is accessible from within the cockpit of the automobile. Thus, the cable 38 of valve 10 is preferably very long and flexible such that, while the intake line 12, actuator line 14, and restriction coupling 16 are mounted outside the interior of the automobile, the cable 38 may be directed back toward the interior of the automobile and proper adjustments may be made to provide the knob 40 as an element of the valve 10 that is accessible from within the automobile.

In the particularly preferred embodiment of this invention, the cable 38 is rotatably received within a sheath 46 to protect it from wear. Additionally, the connection of the cable 38 and associated bullit 34 to restriction coupling 16 is reinforced by a bracket 48. The knob 40 is likewise associated with a bracket 50 to aid in mounting the knob 40 in the interior of an automobile. Bracket 50 might be mounted by a fastener, such as indicated by the numeral 51, but this invention is not to be limited thereto or thereby. Intake line 12 and actuator line 14 are made of appropriate tubing or hoses, which fit over nozzles 52 and 54 that respectively extend from the inlet 22 and outlet 24 of restriction coupling 16.

With respect to operation of the manual boost control valve 10 of this invention, it should be readily apparent that valve 10 serves to adjust the conditions at which the wastegate 114 would be actuated in a turbocharger system 100. Particularly, if the bias placed on the biased stopper 30 is increased (i.e., by turning the knob 40 to increase the compression of the spring 32), the pressure at intake line 12, generated by the compressor 112, must be larger to force air into and through restriction coupling 16 to effect operation of the wastegate actuator 116. Likewise, when the knob 40 is operated so as to loosen the bias on the biased stopper 30, a lesser pressure is needed at the intake side 102 of the turbocharger system 100 to cause the wastegate 114 to be actuated. Thus, with the manual boost control valve 10 of this invention, the boost of a turbocharger system 100 can be adjusted from within the cockpit of an automobile. The adjustment is manual, and therefore, much easier to maintain than electronic boost controllers of the prior art. Additionally, the manual boost control valve 10 is easier to manufacture and operate.

In light of the foregoing, it should thus be evident that the manual boost control valve of this invention substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A manual boost control valve for an automobile turbocharger of the type having a turbine that is spun by the airflow in the exhaust of the automobile, a compressor connected to the turbine to rotate therewith and thereby pressurize the airflow into the cylinders of the automobile, a wastegate located in the exhaust of the automobile for bypassing a portion of the airflow in the exhaust around the turbine, and a wastegate actuator, the manual boost control valve comprising:

an intake line having an inlet and an outlet and communicating at said inlet with the airflow pressurized by the compressor;

a restriction coupling having an inlet and an outlet and communicating at said inlet with said outlet of said intake line for receiving airflow pressurized through said intake line;

an actuator line having an inlet communicating with said outlet of said restriction coupling, for receiving airflow pressurized through said restriction coupling, and an outlet communicating with the wastegate actuator, wherein said restriction coupling includes:

a biased stopper blocking the connection between said outlet of said intake line and said inlet of said restriction coupling such that the airflow pressurized through said intake line must be sufficient to move said biased stopper; and means for manually adjusting the degree of bias placed upon said biased stopper, wherein said means for adjusting is manipulated from within the cockpit of the automobile.

2. The manual boost control valve according to claim 1, wherein said biased stopper is a spherical stopper.

3. The manual boost control valve according to claim 2, wherein said restriction coupling further includes a spring providing a biasing force on said spherical stopper.

4. The manual boost control valve according to claim 1, wherein said means for adjusting the degree of bias placed upon said biased stopper includes a spring providing a biasing force on said biased stopper according to the degree of compression of said spring, and means for adjusting the degree of compression of said spring.

5. The manual boost control valve according to claim 4, wherein said means for adjusting the degree of compression of said spring includes a knob adapted to be accessible from within the cockpit of the automobile, and a cable interconnected between said knob and said restriction coupling, turning of said knob causes rotation of said cable to selectively increase or decrease the compression of said spring.

* * * * *